C. C. LAMB.
EGG BOILER.
APPLICATION FILED OCT. 13, 1917.

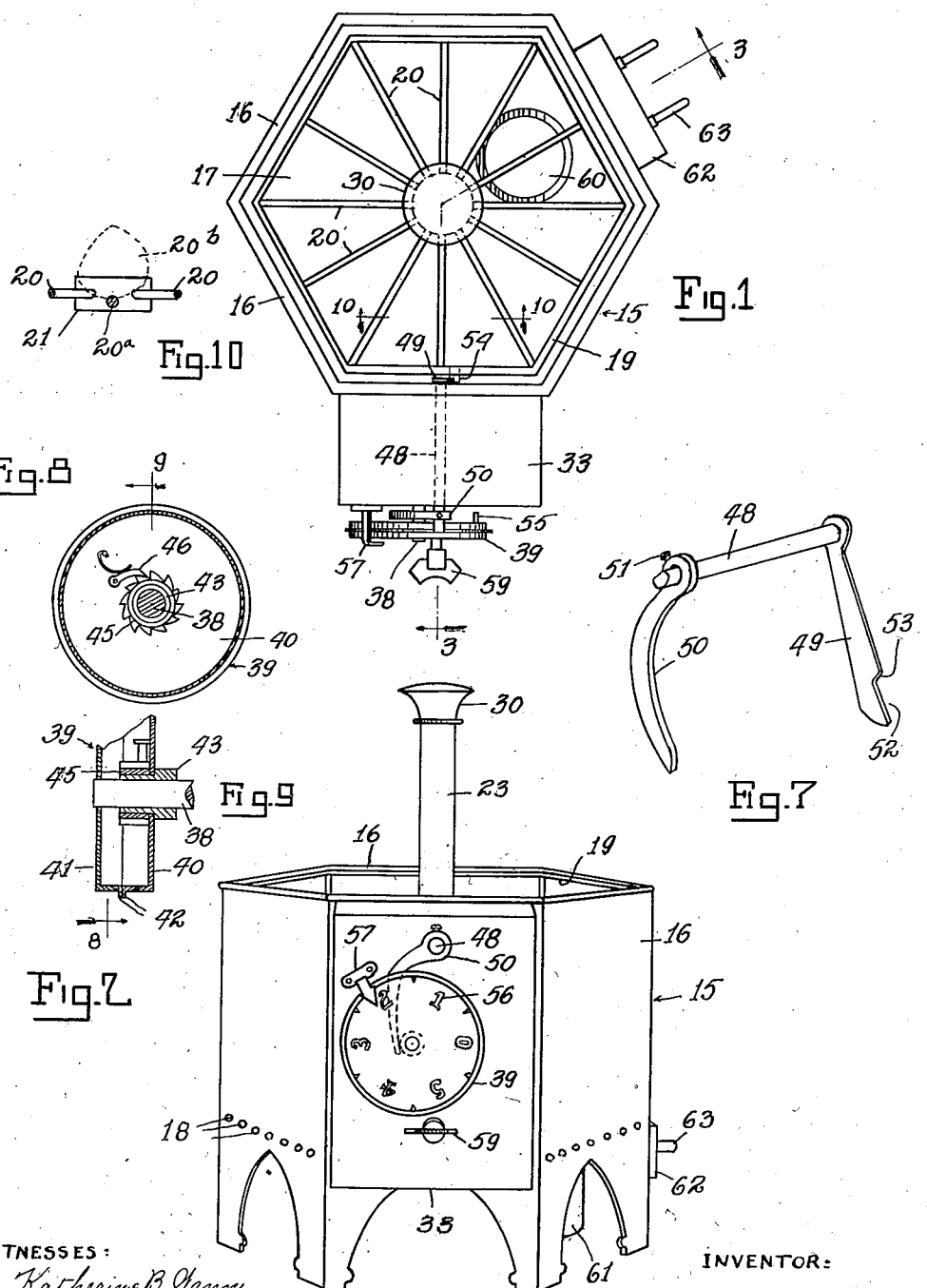

1,377,983.

Patented May 10, 1921.
2 SHEETS—SHEET 2.

WITNESSES:
Katherine B. Harris
Clara L. Peoples

INVENTOR:
CHARLES C. LAMB
By Eugene Elkum
ATTY.

UNITED STATES PATENT OFFICE.

CHARLES CALVERT LAMB, OF CHICAGO, ILLINOIS.

EGG-BOILER.

1,377,983.　　　　　Specification of Letters Patent.　　Patented May 10, 1921.

Application filed October 13, 1917. Serial No. 196,359.

*To all whom it may concern:*

Be it known that I, CHARLES C. LAMB, a citizen of the United States, residing at Chicago, in the county of Cook and State of Illinois, have invented new and useful Improvements in Egg-Boilers, of which the following is a specification.

This invention relates to automatic egg boilers, that is, egg boilers of that type wherein the eggs are automatically withdrawn from the boiling water in the tank at the expiration of the period of time previously set for boiling such eggs.

Among the objects of my invention is to improve the construction of egg boilers of the kind referred to, in the several particulars as will hereinafter more fully appear, and to provide, in particular, an egg boiler wherein the time-controlled mechanism and the releasing and setting devices are all located below the edge of the tank so as to be removed from the steam zone above the tank and therefore not subjected to the heat thereof.

Another object of my invention is to so locate the lifting or raising means for the egg-holding basket or receptacle within the tank that such parts will not interfere in any manner with placing or depositing the eggs to be boiled in the basket or removing the eggs therefrom after being boiled.

A further object of my invention is to provide a basket or egg-holding receptacle with a bottom wall having shallow pockets or depressions adapted to receive the eggs, and thus guard against the latter being broken or cracked by shifting one against the other during the raising and lowering of the basket. A still further object of my invention is to heat the water in the tank by an electrical means, and so position such means that the same will not be in the path of vertical movement of the egg-holding basket or receptacle, and thus permit the bottom of the same to be brought close to the bottom of the tank for allowing the height of the tank and the volume of water required to be reduced to the minimum.

A still further object of my invention is to provide a novel type of releasing or trigger mechanism.

The invention consists further in the matters hereinafter described and more particularly pointed out in the appended claims.

In the accompanying drawings—

Figure 1 is a top plan view of an egg boiler constructed in accordance with my invention;

Fig. 2 is a perspective view of said boiler;

Fig. 7 is a perspective view of the trigger mechanism removed from the egg boiler;

Fig. 8 is a vertical sectional view taken on line 8— of Fig. 9;

Fig. 9 is a fragmentary vertical sectional view taken on line 9— of Fig. 8; and

Fig. 10 is a sectional view taken on line 10—10 of Fig. 1.

Figure 5:
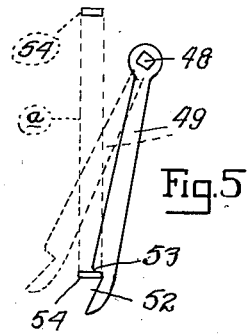
Fig. 5 is an elevational view of the inner arm of the trigger mechanism, looking at the same from the inside of the egg boiler.

As shown in the drawings, an egg boiler embracing the features of my invention comprises an upwardly opening tank 15 having upright marginal walls 16 and a bottom wall 17, which in the instance illustrated is secured to the upright walls of the tank above the lower end thereof by a plurality of rivets or other fastening members 18, 18. The marginal walls 16 continue downward the same distance below said bottom wall and form legs for supporting the device in an upright position on a table or other support. The tank 15 may be given any cross-sectional shape desired, but for illustrative purposes I have shown the same hexagonal. Within the tank is an upwardly opening egg-holding receptacle or basket 19, the latter conforming to the cross-sectional shape of the tank and adapted to be lowered into and raised out of the boiling water therein. By making the tank and basket polygonal in shape, the upright walls of the former serve to guide the basket in its vertical movement and further prevent the basket from being turned or twisted about its vertical axis. As shown, said basket 19 is made of wire, with the bottom rods 20 arranged radial and having their outer ends bent upward to form the sides of the basket.

Figure 3:
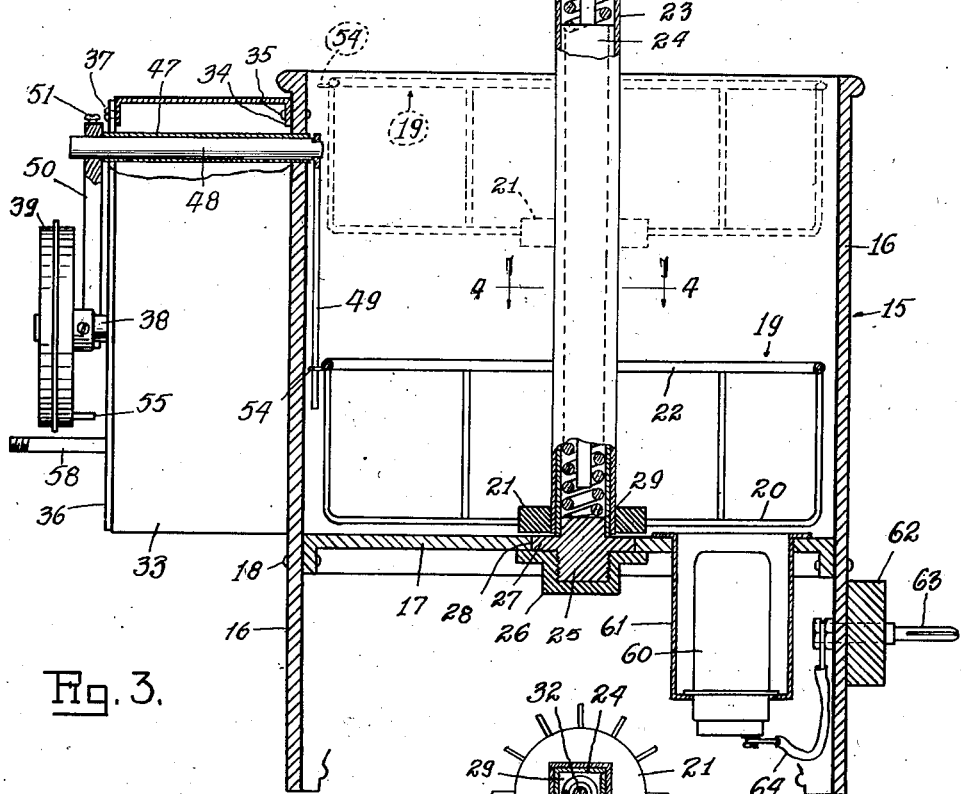
Fig. 3 is a vertical sectional view taken on the indirect line 3—3 of Fig. 1.
Figure 4:
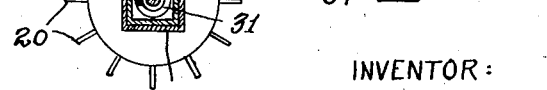
Fig. 4 is a horizontal sectional view taken on line 4—4 of Fig. 3.

The inner ends of said rods 20 are secured to an annular base member 21 located centrally in the bottom of said basket. The upper ends of said rods are connected together by a rod 22 at the top of the basket and forming the rim thereof. Secured to and projecting upward from said base member 21 is a hollow tube 23, which may have any cross-sectional shape desired, but preferably square, as shown in Fig. 4. Said tube 23 fits over and slides on a square inner tube 24, open at its upper end and connected with and extending upward from the center of the bottom wall 17. Said inner tube 24 may be connected with said bottom wall 17 in any suitable manner, but, as shown, such connection comprises a plug 25 screwed into a socket member 26, which is secured to the under side of said bottom wall 17. Said plug 25 has an annular flange 27 set in an opening or hole 28 in said bottom wall 17. The plug 25 is also provided with an upwardly projecting, square portion 29, which extends into the lower end of the inner tube 24 and to which said inner tube is rigidly secured. By the construction described, the inner tube and its plug may be removed from the tank by unscrewing such parts. Said inner tube 24 extends upward from the bottom wall to a point just above the top of the tank 15, as shown in Fig. 3. The outer tube 23 is somewhat longer than the inner tube and is provided at its upper end with a knob 30. For raising the basket 19 vertically out of the water in the tank 15 and maintaining the same in such position when not in use, I provide a helical spring 31, located within the inner tube and bearing downward at its lower end against the plug 25 and bearing upward at its upper end against the knob 30. Said spring always tends to expand and maintain the basket 19 raised out of the water in the tank 15, as shown in full lines in Fig. 2 and in dotted lines in Fig. 3. When the basket 19 is raised, the spring 31 has expanded to its fullest extent and still bears against the plug 25 and knob 30, respectively. To depress the basket 19 into the water in the tank 15, the operator or waiter pushes downward on the knob 30, thereby forcing the outer tube and connected basket downward and compressing the spring within said tubes. To maintain the basket in such lowered position, I provide a trigger mechanism, to be presently described. To prevent the spring from buckling while being compressed, I secure to the knob 30 a downwardly extending rod 32, which as shown extends downward through the spring. The lower end of the rod terminates short of the lower end of the outer tube, so that such end of the rod will not come into contact with the plug 25 when the basket is depressed into the tank.

In the device shown, the basket 19 is made of such size as to hold six eggs at one time. In order to maintain each one of the six eggs in its proper position in the basket, so that the probability of breaking or cracking the eggs by one being shifted against the adjacent ones is reduced, I construct the bottom of the basket in such a way that each egg occupies what may be termed a "shallow pocket." To accomplish this, I offset certain of the bottom rods 20 slightly below the bottom of the basket. In Fig. 1, it will be noted that the rods 20 are so arranged that the bottom of the basket is divided, so to speak, into six segments and with a bottom rod extending centrally and radially through each segment. Such bottom rod of each segment is offset slightly downward below the plane of the two opposite side rods, so that when an egg is placed in such segment the egg will rest on the centrally disposed, downwardly offset rod and be held from lateral shifting by the two opposite side rods, as clearly shown in Fig. 10, wherein I have indicated such downwardly offset rod by 20$^a$ and an egg in said pocket by 20$^b$. Each of the six segments is made in a like manner, and by the construction described the so-called "shallow pocket" referred to is gained.

Figure 6:
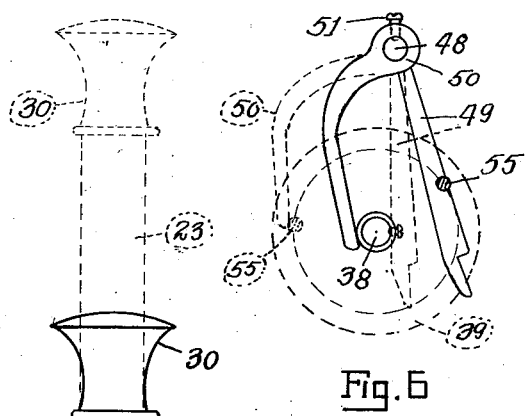
Fig. 6 is an elevational view of the outer arm of said trigger mechanism, the intervening motor casing and tank wall being omitted in order to show the inner arm of said trigger device.

For holding the basket 19 in its lowered position in the tank, so that the eggs contained therein will be submerged in the boiling water in the tank and thus be cooked or boiled, I provide a trigger mechanism of the following construction: Secured to one of the upright walls of the tank 15 and on the outside thereof, is a hollow casing 33, which as shown is substantially rectangular in shape. Said casing 33 is provided with an inner marginal flange 34 in contact with the associated tank wall and secured thereto by a rivet or like fastening member 35. The front of the casing is closed by a removable cover plate 36, which is secured to the casing by suitable screws 37, as shown in Fig. 3. Within the casing is located a clock, an electric motor, or other prime mover having a driving shaft 38 projecting outward through the cover plate. Mounted on said shaft 38 is an annular member, preferably in the form of a hollow disk 39, the latter having a pawl and ratchet connection with said shaft. Said pawl and ratchet mechanism is so arranged that the shaft 38 will rotate said disk in the same direction as the shaft rotates, but will permit said disk to be turned manually about said shaft in the same direction but faster than the same, for the purpose of setting the disk. In Figs. 8 and 9, I have shown such pawl and ratchet mechanism, and the manner in which the parts are mounted on said shaft 38. As illustrated, the disk 39 is made in two annular parts, a back 40 and a front 41, the two being secured together along meeting rims or flanges 42, 42. Mounted on said shaft 38 is a hub 43 and secured to rotate therewith by a set screw or the like. Said hub extends into the disk through the back wall thereof. Secured to the hub within the disk is a collar 45 provided with ratchet teeth engaged by a spring-pressed pawl 46 carried by said disk. From the above it is clear that the disk may be adjusted about the shaft in the same direction as the same rotates and without stopping said shaft. Extending through the clock casing 33 above the disk 39 is a hollow tube 47, the latter opening at its inner end into the tank 15 and at its outer end through the cover plate 36. Said tube is fixed in such parts so as to be held against rotation as well as endwise movement and prevents steam in the tank from entering said casing through the hole in the tank wall through which the tube extends. Extending through said tube is a rod 48, one end of which projects into the tank 15, while the other end projects outward beyond the front of the casing 33. The inner end of said rod 48 is reduced and made angular in cross-section and is adapted to have secured thereto a depending arm 49, the latter extending downward into the tank and being swung sidewise when said rod 48 is oscillated. Mounted on the outer end of said rod 48 is a depending arm 50, the latter being secured to said rod by a set screw 51. Said arms 49, 50, when secured to said rod, hold the latter against endwise movement in the tube 47. When the outer arm 50 is removed, the rod 48 and its inner arm 49 may be removed from the tube by withdrawing the same therefrom. The inner arm 49 extends downward and is provided at its lower end with a notch 52, having a downwardly facing, locking shoulder 53. The basket 19 is provided with a lug 54, adapted to engage beneath said locking shoulder 53, so as to hold the basket depressed in the tank 15. The inner arm 49, when the basket is raised, occupies the position shown in dotted lines in Fig. 5 and full lines in Fig. 6, thus being in the path of downward movement of the lug 54, as shown by the dotted line a in said Fig. 5. Manifestly, when the basket is depressed into the bottom of the tank, its lug 54 will during such downward movement contact with said arm and move the same into the position shown in full lines in Fig. 5, whereupon said lug 54 will become locked with said arm 49 and the latter hold the basket submerged in the water in the tank. The spring 31 holds the basket against the locking shoulder 53, and the weight of the outer arm holds the inner one against said lug 54. To release the inner arm from its locking engagement with the basket, so that the basket may be raised by its spring above the water in the tank, I employ the outer arm 50, which as shown in Fig. 6, is of such shape and weight as to swing by gravity against the shaft 38. The weight of said outer arm 50 is sufficient to maintain the same against the shaft 38 when the basket is raised and, consequently, maintain the inner arm in position to be engaged by the basket when depressed. Projecting from the back of the disk 39 is a trip pin 55 adapted in the rotation of the disk by the shaft 38 to be brought into contact with the outer arm 50 and swing the inner arm out of locking engagement with the basket, the rod 48 of course being oscillated during such operation. In Fig. 6, the trip pin 55 is shown in full lines in one of its starting positions, while said pin is shown in dotted lines just about to pass the lower end of the outer arm after having moved the latter to unlock the basket from the inner arm.

The outer face of the disk 39 is provided with a plurality of circumferentially spaced numerals 56, which as shown in Fig. 2 number from "0" to "5" and are spaced equal distances apart. The trip pin 55 is directly behind the numeral "0." The numerals are spaced a minute apart, that is, when the disk 39 is revolved manually so that the numeral "1" comes opposite the pointer 57, it will require a full one minute of time for the trip pin 55 to be moved by the disk in contact with and past the free end of the outer arm 50. In Fig. 2, the disk 39 is shown set in a position whereby a trifle over two minutes of time will be required before the trip pin will move into contact with and past the outer arm 50. Consequently, an order of eggs placed in the basket 19 may be cooked for any desired period of time up to the maximum limit provided on the disk 39, and as soon as such period of time has expired the basket 19 will automatically be raised out of the boiling water in the tank 15. Although I have shown the disk divided for only five minutes of time, it is of course to be understood that the disk may be divided into any desired number of time units and the speed of rotation of the parts arranged accordingly.

To use the device shown, the eggs to be cooked are placed in the basket while the latter is in its raised position, as shown in dotted lines in Fig. 3, then the disk 39 is set for the period of time desired for cooking such eggs, whereupon the basket is depressed into the boiling water in the tank and held in its lowered position by the trigger mechanism described. The clock or motor, as the case may be, rotates the shaft 38, thereby causing the trip pin 55 to be carried into contact with and past the outer arm 50. Said trip pin will pass the outer arm 50 when the predetermined period of time set for boiling the eggs has expired, and thus the inner arm will be moved from engagement with the basket and the latter be raised by the spring out of the boiling water in the tank. To cook an order of eggs for a shorter or longer period of time, the disk 39 is set accordingly and the operations above repeated. If a clock is used for rotating the shaft 38, said clock will be provided with a winding stem 58, which as shown in the drawings projects outward from the casing 33 and is provided with a key 59.

In order to heat the water in the tank 15, I provide an electric heating element 60, which, as shown in Fig. 3, is located in a well 61 extending below the bottom wall 17 but opening upward into the interior of the tank. Secured to the tank wall, adjacent the coil, is an insulating block 62, provided with plug contacts 63, 63, whereby said heating element may be connected with a suitable source of electric supply, such as a lamp socket or the like. Conductor wires 64 lead from the plugs 63 to the heating element 60. The heating element 60 is located in the well below the bottom of the tank, so that the coil will be always immersed in water, even though the level thereof drops to the bottom of the tank. Furthermore, the coil is located below the bottom of the tank so as to not interfere with the basket 19 and thus permit the bottom of the same to come close to the bottom of the tank and consequently reduce the height of the tank and bring the necessary amount of water to the minimum. This is also one of the purposes of setting the plug 25 in the bottom wall of the tank, so that no portion of the plug will project above the bottom wall of the tank and prevent the bottom of the basket from being brought close to such bottom wall.

By arranging the clock or motor casing 33 and the setting disk 39 in front of the tank and below the upper edge thereof, such parts are removed from the steam zone above the tank and consequently not subjected to the excessive heat thereof. The result is that the setting member 39 does not become so hot as to burn the fingers of the operator or waiter in using my boiler, even though the latter is maintained in condition for immediate use for a considerable period of time. Furthermore, with my device the operator or waiter is not required to place his hand into the steam zone above the tank in order to set the disk 39. This is an advantage, when it is remembered that egg boilers in restaurants are maintained in condition for immediate use for hours at a time, and with the water in the tank kept at the boiling point an exceedingly hot body of steam is always rising above the same. Then again, with my arrangement the clock or motor is removed from such steam zone, the advantages of this being apparent, as the clock or motor is the most delicate part of the device, and for the latter to be used with success, it must always be in condition to operate. Then again, by having all of the operative parts of my device in front of the tank and removed from above the same, there are no parts in the way to interfere with or hinder the placing of eggs in or removing the same from the basket 19. Other and further advantages of my device will be readily apparent to those skilled in the art to which my invention appertains.

Although I have shown and described herein in detail an egg boiler embodying the several features of my invention, it is to be of course understood that the details of construction and the arrangement of parts illustrated may be variously changed and modified without departing from the spirit and scope of my invention, and I do not wish to be limited to the details of construction and arrangement of parts shown, except as pointed out in the appended claims.

I claim as my invention:

1. An egg boiler, comprising a tank, a receptacle vertically movable therein, means for raising said receptacle, an arm extending downward into said tank from adjacent the upper edge thereof and moved by said receptacle into locking engagement therewith upon the depression of the receptacle in said tank, and time controlled means for effecting the movement of said arm out of locking engagement with said receptacle.

2. An egg boiler, comprising a tank, a receptacle vertically movable therein, means for raising said receptacle, a pivotally mounted arm extending downward into said tank from adjacent the upper edge thereof and moving automatically into locking engagement with said receptacle upon the depression of the same in said tank, and time controlled means for effecting the movement of said arm out of locking engagement with said receptacle.

3. An egg boiler, comprising a tank, a receptacle vertically movable therein, means for raising said receptacle, an arm pivotally mounted on one of the upright walls of said tank and adapted to have locking engagement with said receptacle for holding the same depressed in said tank, said arm extending downward into said tank from adjacent the upper edge thereof and having movement in a plane parallel to the tank wall upon which it is mounted, and time controlled means for effecting the movement of said arm out of locking engagement with said receptacle.

4. An egg boiler, comprising a tank, a receptacle vertically movable therein, means for raising said receptacle, a trigger mechanism having two connected arms, one extending downward into said tank from adjacent the upper edge thereof and moved by the receptacle into locking engagement therewith upon the depression of the receptacle in said tank, and the other arm extending downward on the outside of the tank, and time controlled means adapted to operate on the outer arm for moving said inner arm out of locking engagement with said receptacle.

5. An egg boiler, comprising a tank, a receptacle vertically movable therein, means for raising said receptacle, a trigger mechanism having two connected arms, one extending downward into said tank from adjacent the upper edge thereof and adapted to have locking engagement with said receptacle for holding the same depressed in said tank, and the other arm extending downward on the outside of the tank, and time controlled means including a shaft below the upper edge of said tank, a disk on said shaft and provided with a trip member to operate on said outer arm for moving said inner arm out of locking engagement with said receptacle, and means connecting said disk with said shaft for permitting the disk to be adjusted circumferentially about said shaft for setting said trip member.

6. An egg boiler, comprising a tank, a receptacle vertically movable therein, means for raising said receptacle, a trigger mechanism having an inner arm and an outer arm, the former being inside of the tank and the latter on the outside thereof, a rockably mounted rod connecting said arms together, and both of said arms extending downward from adjacent the upper edge of said tank; the inner arm being moved by the receptacle into locking engagment therewith upon the depression of the receptacle in said tank, and time controlled means adapted to operate on said outer arm for moving the inner arm out of locking engagement with said receptacle.

7. An egg boiler, comprising a tank, a receptacle vertically movable therein, means for raising said receptacle, a trigger mechanism having an inner arm and an outer arm, the former being inside of the tank and the latter on the outside thereof, a rod rockably mounted on one of the upright walls of said tank and connecting said arms together, both of said arms extending downward from adjacent the upper edge of the tank and having movement in planes parallel to each other and to said tank wall; the inner arm adapted to have locking engagement with said receptacle for holding the same depressed in said tank, a shaft mounted below the upper edge of said tank and extending outward from said tank wall, a disk mounted on said shaft and provided with a trip pin adapted to operate on said outer arm for moving the inner arm out of locking engagement with said receptacle, and time controlled means for rotating said shaft.

8. An egg boiler, comprising a tank, a receptacle vertically movable therein, means for raising said receptacle, a trigger mechanism having an inner arm and an outer arm, the former being inside of the tank and the latter on the outside thereof, a rod rockably mounted on one of the upright walls of said tank and connecting said arms together, both of said arms extending downward from adjacent the upper edge of the tank and having movement in planes parallel to each other and to said tank wall; the inner arm adapted to have locking engagement with said receptacle for holding the same depressed in said tank, a shaft mounted below the upper edge of said tank and extending outward from said tank wall, a disk mounted on said shaft and provided with a trip pin rigidly fixed thereto and adapted to operate on said outer arm for moving said inner arm out of locking engagement with said receptacle, means connecting said disk with said shaft for permitting the disk to be adjusted circumferentially about said shaft for setting said trip pin, and time controlled means for rotating said shaft.

9. An egg boiler, comprising a tank, a receptacle vertically movable therein, means for raising said receptacle, a hollow casing mounted on one of the upright walls of said tank, a trigger mechanism having an inner arm and an outer arm, the former located inside of the tank and the latter on the outside of said casing, a tube extending through said casing and the tank wall to which the latter is secured, a rod rockably mounted in said tube and connecting said arms together, said arms extending downward from adjacent the upper edge of said tank, and the inner arm adapted to have locking engagement with said receptacle for holding the same depressed in said tank, a motor located in said casing and provided with a shaft extending outward from said casing, a disk mounted on said shaft and provided with a trip pin for operating on said outer arm for moving said inner arm out of locking engagement with said receptacle.

In testimony that I claim the foregoing as my invention, I affix my signature in the presence of two witnesses, this 10th day of October, A. D. 1917.

CHARLES CALVERT LAMB.

Witnesses:
EUGENE C. WANN,
CLARA L. PEOPLES.